(12) United States Patent
Furuyama et al.

(10) Patent No.: US 12,390,874 B2
(45) Date of Patent: Aug. 19, 2025

(54) ARC WELDING CONTROL METHOD

(71) Applicant: Panasonic Intellectual Property Management Co., Ltd., Osaka (JP)

(72) Inventors: Yuya Furuyama, Hyogo (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 825 days.

(21) Appl. No.: 17/072,859

(22) Filed: Oct. 16, 2020

(65) Prior Publication Data
US 2021/0031293 A1 Feb. 4, 2021

Related U.S. Application Data

(63) Continuation of application No. PCT/JP2019/016032, filed on Apr. 12, 2019.

(30) Foreign Application Priority Data

Apr. 18, 2018 (JP) ................................. 2018-080130

(51) Int. Cl.
*B23K 9/173* (2006.01)
*B23K 9/095* (2006.01)
(Continued)

(52) U.S. Cl.
CPC .............. *B23K 9/173* (2013.01); *B23K 9/095* (2013.01); *B23K 9/125* (2013.01); *B23K 9/23* (2013.01);
(Continued)

(58) Field of Classification Search
CPC ........ B23K 9/173; B23K 9/125; B23K 9/095; B23K 9/23; B23K 35/38; B23K 2103/10; B23K 2103/12; B23K 9/092; B23K 9/12
(Continued)

(56) References Cited

U.S. PATENT DOCUMENTS 10,220,464 B2 * 3/2019 Ide ......................... B23K 9/092
2012/0074114 A1 3/2012 Kawamoto et al.
(Continued)

FOREIGN PATENT DOCUMENTS

EP 2576120 B1 * 2/2019 ............. B23K 9/125
JP 2004298924 A * 10/2004
(Continued)

OTHER PUBLICATIONS

Machine translation of JP-2016147267: Nakamata, Arc-welding control method, 2016 (Year: 2016).*
(Continued)

*Primary Examiner* — Ibrahime A Abraham
*Assistant Examiner* — Abigail H Rhue
(74) *Attorney, Agent, or Firm* — Wenderoth, Lind & Ponack, L.L.P.

(57) ABSTRACT

Forward feeding for feeding a welding wire in a direction of a workpiece and backward feeding for feeding in an opposite direction to the forward feeding are alternately performed, and the welding wire is fed at a wire feeding speed cyclically changed in a predetermined cycle and at a predetermined amplitude to perform welding by repeating an arc period and a short-circuit period. Provided during forward feeding, stopping feeding of the welding wire from a time of an elapse of a half cycle of a change of the wire feeding speed to an elapse of a first feeding stop period, and feeding the welding wire forward at a first feeding speed from an elapse of the first feeding stop period to an elapse of a predetermined period. The welding wire is fed backward after the elapse of the predetermined period.

13 Claims, 5 Drawing Sheets

(51) Int. Cl.
*B23K 9/12* (2006.01)
*B23K 9/23* (2006.01)
*B23K 35/38* (2006.01)
*B23K 103/10* (2006.01)
*B23K 103/12* (2006.01)

(52) U.S. Cl.
CPC .......... *B23K 35/38* (2013.01); *B23K 2103/10* (2018.08); *B23K 2103/12* (2018.08)

(58) Field of Classification Search
USPC ... 219/30.21, 124.34, 125.12, 76.14, 130.01, 219/74
See application file for complete search history.

(56) References Cited

U.S. PATENT DOCUMENTS

| | | | |
|---|---|---|---|
| 2013/0082040 A1 | 4/2013 | Kawamoto et al. | |
| 2013/0082041 A1 | 4/2013 | Kawamoto et al. | |
| 2017/0216952 A1 | 8/2017 | Ide | |
| 2018/0099346 A1* | 4/2018 | Zwayer | B23K 9/125 |
| 2019/0224771 A1 | 7/2019 | Fujiwara et al. | |

FOREIGN PATENT DOCUMENTS

| | | | |
|---|---|---|---|
| JP | 5090760 B2 * | 12/2012 | |
| JP | 2013-22593 | 2/2013 | |
| JP | 2014226708 A * | 12/2014 | |
| JP | 2016-73996 | 5/2016 | |
| JP | 2016147267 A * | 8/2016 | |
| JP | 2016-168617 | 9/2016 | |
| JP | 2018-008304 | 1/2018 | |
| WO | 2010/146844 | 12/2010 | |
| WO | 2016/027638 | 2/2016 | |
| WO | 2018/051911 | 3/2018 | |

OTHER PUBLICATIONS

Machine translation of JP-5090760: Adachi, A welding torch and an arc start method of robot arc welding, 2012 (Year: 2012).*
Machine translate of JP-2004298924: Do, Feed control method for arc welding accompanied with short circuit, 2004 (Year: 2004).*
Machine translation of JP2014226708: Fujiwara, Method of Controlling Arc Welding and Welding Apparatus, 2014 (Year: 2014).*
Machine translation of JP-2004298924: Do, Method for controlling feed in arc welding involving short circuit, 2004 (Year: 2004).*
Extended European Search Report issued Jun. 18, 2021 in corresponding European Patent Application No. 19788467.9.
International Search Report issued Jul. 9, 2019 in International (PCT) Application No. PCT/JP2019/016032 with English translation.
Office Action issued Jun. 30, 2022 in corresponding Indian Patent Application No. 202047049018.

* cited by examiner

FIG.1

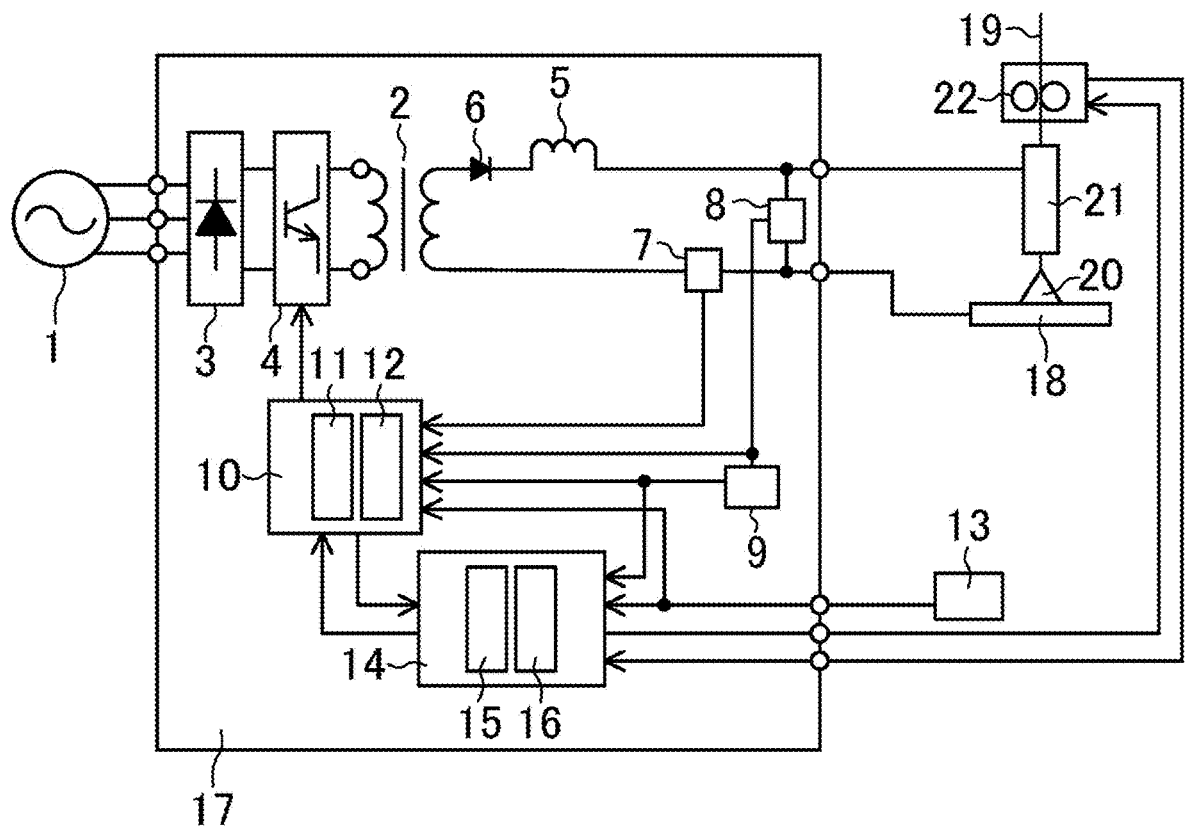

【DESCRIPTION OF REFERENCE CHARACTERS】

| | | | |
|---|---|---|---|
| 1 | INPUT POWER SOURCE | 13 | WELDING CONDITION SETTING PART |
| 2 | MAIN TRANSFORMER (TRANSFORMER) | 14 | WIRE FEEDING SPEED CONTROLLER |
| 3 | PRIMARY SIDE RECTIFIER | 15 | WIRE FEEDING SPEED DETECTOR |
| 4 | SWITCH | 16 | CALCULATOR |
| 5 | DCL (REACTOR) | 17 | ARC WELDING APPARATUS |
| 6 | SECONDARY SIDE RECTIFIER | 18 | WORKPIECE |
| 7 | WELDING CURRENT DETECTOR | 19 | WELDING WIRE |
| 8 | WELDING VOLTAGE DETECTOR | 20 | ARC |
| 9 | SHORT-CIRCUIT AND ARC DETECTOR | 21 | WELDING TIP |
| 10 | OUTPUT CONTROLLER | 22 | WIRE FEEDER |
| 11 | SHORT-CIRCUIT CONTROLLER | | |
| 12 | ARC CONTROLLER | | |

ARC WELDING CONTROL METHOD

CROSS-REFERENCE TO RELATED APPLICATIONS

This is a continuation of International Application No. PCT/JP2019/016032 filed on Apr. 12, 2019, which claims priority to Japanese Patent Application No. 2018-080130 filed on Apr. 18, 2018. The entire disclosures of these applications are incorporated by reference herein.

BACKGROUND

The present invention relates to a consumable electrode type arc welding control method.

Consumable electrode type arc welding has been put to practical use in recent years, in which repeatedly feeding of a welding wire forward and backward is performed to alternately produce arc periods and short-circuit periods to weld a base material as a welding object, for a purpose of reducing spatters generated during welding.

For example, WO 2010/146844 discloses an arc welding control method which stops a cyclic change and constantly controls a wire feeding speed at a first feeding speed in a case where no short circuit occurs until the wire feeding speed reaches a predetermined wire feeding speed during forward feeding of the welding wire with deceleration of the wire feeding speed. When a short circuit occurs during forward feeding at the first feeding speed, deceleration starts from the first feeding speed to restart the cyclic change and perform welding. According to this method, uniform welding beads can be obtained without increasing spatters even when disturbance such as a change in a distance between a tip and a base material is produced.

SUMMARY

According to the conventional method disclosed in WO 2010/146844, the feeding speed of the welding wire is controlled at the constant speed to promote occurrence of a short circuit.

However, when the welding wire is fed forward to the base material at a feeding speed higher than usual, the welding wire vigorously collides with the base material. In this case, spatters generated by occurrence of a short circuit increase. Moreover, when the feeding speed of the welding wire is high, a short circuit is more frequently caused between the welding wire and the base material without interposition of droplets at a wire tip. In this case, the short-circuit period increases, and therefore the short-circuit cycle becomes unstable. Accordingly, arc stability deteriorates.

The present invention has been developed in view of the foregoing. It is an object of the present invention to provide a consumable electrode type arc welding control method capable of reducing spatters and achieving arc stabilization during short-circuiting.

For achieving the above object, an arc welding control method of a consumable electrode type according to the present invention alternately performs forward feeding for feeding a welding wire in a direction of a welding object and backward feeding for feeding in an opposite direction to the forward feeding, and feeds the welding wire at a wire feeding speed cyclically changed in a predetermined cycle and at a predetermined amplitude to perform welding by repeating an arc period and a short-circuit period. The arc welding control method includes: stopping feeding of the welding wire from a time of an elapse of a half cycle of a change of the wire feeding speed to an elapse of a first feeding stop period during forward feeding of the welding wire; and feeding the welding wire forward at a first feeding speed from a time of an elapse of the first feeding stop period to an elapse of a predetermined period. The welding wire is fed backward after the elapse of the predetermined period.

According to this method, spatters generated during short-circuiting can be reduced by reducing impact produced when the welding wire collides with the welding object. In addition, elongation of the short-circuit period can be reduced by reliably short-circuiting the welding wire and the welding object via droplets formed at a tip of the welding wire. Accordingly, improvement of arc stability is achievable by stabilizing the short-circuit cycle.

According to the arc welding control method of the present invention, spatters during short-circuiting can be reduced. In addition, arc stability can be improved.

BRIEF DESCRIPTION OF THE DRAWINGS

FIG. 1 is a schematic diagram showing a configuration of an arc welding apparatus according to one embodiment of the present invention.

DETAILED DESCRIPTION

Figure 2:
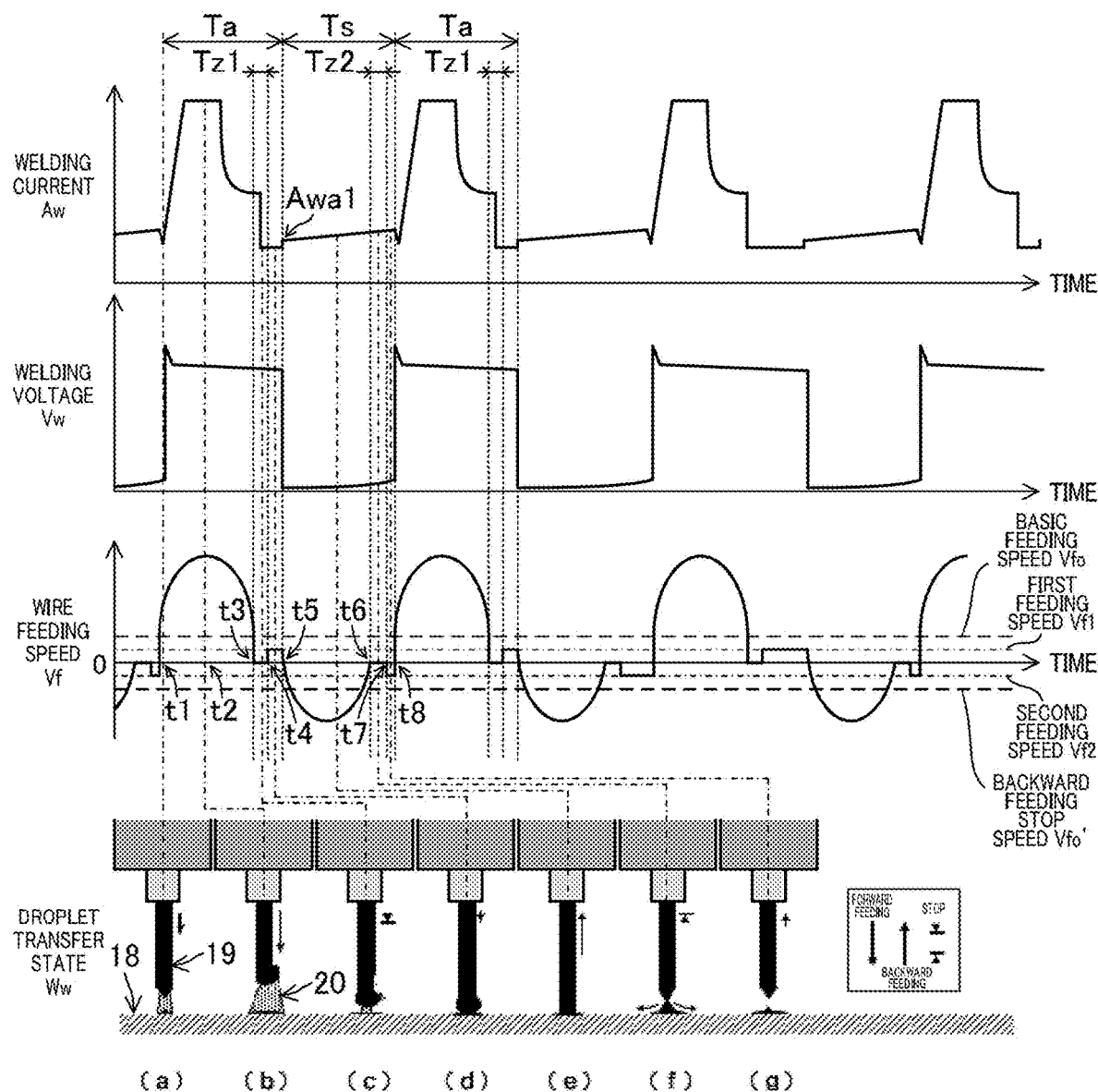
FIG. 2 is a time chart showing various output waveforms during arc welding.

Embodiments of the present invention will be described in detail with reference to the drawings. The following description of advantageous embodiments is mere examples in nature, and is not at all intended to limit the scope, applications or use of the present disclosure.

Embodiment

[Configuration and Operation of Arc Welding Apparatus]

FIG. 1 shows a schematic diagram of a configuration of an arc welding apparatus according to the present embodiment.

An arc welding apparatus 17 repeats an arc state and a short-circuit state between a workpiece 18 which is a welding object and a welding wire 19 which is a consumable electrode to perform welding. While the welding wire 19 is made of a copper alloy in the present embodiment, the material of the welding wire 19 is not particularly limited to this material, but may be other materials. In addition, the welding wire 19 has a wire diameter of 1.0 mm. Besides, an inert gas such as argon is used as an assist gas during arc welding. That is, arc welding presented in the present embodiment is so-called metal inert gas (MIG) welding. However, other gases, such as a gas containing carbon dioxide gas as a main component may be adopted. Note that the gas containing carbon dioxide gas as a main component refers to a gas containing 30% or more of carbon dioxide gas, and other components such as argon or other inert gases. These points will be described below.

The arc welding apparatus 17 includes a main transformer (transformer) 2, a primary side rectifier 3, a switch 4, a DCL (reactor) 5, a secondary side rectifier 6, a welding current detector 7, and a welding voltage detector 8, a short-circuit and arc detector 9, an output controller 10, and a wire feeding speed controller 14.

The primary side rectifier 3 rectifies an input voltage input from an input power source 1 provided outside the arc welding apparatus 17. The switch 4 controls an output of the primary side rectifier 3 at an output suitable for welding. The main transformer 2 converts an output of the switch 4 into an output suitable for welding. The secondary side rectifier 6 rectifies an output of the main transformer 2. The DCL (reactor) 5 smooths an output of the secondary side rectifier 6 to generate a current suitable for welding.

The welding current detector 7 detects a welding current. The welding voltage detector 8 detects a welding voltage. The short-circuit and arc detector 9 determines whether a welding state is the short-circuit state where the workpiece 18 and the welding wire 19 are short-circuited, or the arc state where an arc 20 is generated between the workpiece 18 and the welding wire 19 based on an output of the welding voltage detector 8.

The output controller 10 has a short-circuit controller 11 and an arc controller 12, and outputs a control signal to the switch 4 to control a welding output. When the short-circuit and arc detector 9 determines that the current state is the short-circuit state, the short-circuit controller 11 controls a short-circuit current which is a welding current during the short-circuit period. When the short-circuit and arc detector 9 determines that the current state is the arc state, the arc controller 12 controls an arc current which is a welding current during the arc period. In addition, when the short-circuit and arc detector 9 determines that the current state is the short-circuit state or the arc state, the short-circuit and arc detector 9 sends a detection signal to the wire feeding speed controller 14. The wire feeding speed controller 14 determines switching timing for switching between forward feeding and backward feeding of the welding wire 19 based on the detection signal.

The wire feeding speed controller 14 has a wire feeding speed detector 15 and a calculator 16, and controls a wire feeder 22 to control a feeding speed of the welding wire 19. The wire feeding speed detector 15 detects a wire feeding speed Vf (see FIG. 2) described below. The calculator 16 calculates an integrated amount of feeding amounts of the welding wire 19 and the like based on a signal from the wire feeding speed detector 15. In addition, the calculator 16 outputs, to the wire feeder 22, a control signal for stopping feeding of the welding wire 19, and a control signal for switching between forward feeding and backward feeding of the welding wire 19.

A welding condition setting part 13 and the wire feeder 22 are connected to the arc welding apparatus 17. The welding condition setting part 13 is provided to set welding conditions of the arc welding apparatus 17. The wire feeder 22 controls feeding of the welding wire 19 based on a signal from the wire feeding speed controller 14.

A welding output of the arc welding apparatus 17 is supplied to the welding wire 19 via a welding tip 21. Thereafter, an arc 20 is generated between the welding wire 19 and the workpiece 18 based on the welding output of the arc welding apparatus 17 to perform welding.

Next, an operation of the arc welding apparatus 17 configured as above will be described with reference to FIG. 2. FIG. 2 is a time chart of various output waveforms during arc welding according to the present embodiment. Specifically, FIG. 2 shows changes of the wire feeding speed Vf, a welding current Aw, and a welding voltage Vw with time in arc welding where short-circuit periods Ts and arc periods Ta are alternately repeated. FIG. 2 further shows a change of a droplet transfer state Ww with time at a tip of the welding wire 19.

As shown in FIG. 2, the wire feeding speed Vf, which is a feeding speed of the welding wire 19, cyclically changes in a predetermined cycle and at a predetermined amplitude. As apparent from FIG. 2, the cycle of the wire feeding speed Vf corresponds to a sum of the short-circuit period Ts and the arc period Ta. In addition, when the wire feeding speed Vf is positive (in FIG. 2, above a line of Vf=0), the welding wire 19 is fed so as to approach the workpiece 18, that is, a forward feeding operation is performed. When the wire feeding speed Vf is negative (in FIG. 2, below the line of Vf=0), the welding wire 19 is fed so as to separate away from the workpiece 18, that is, a backward feeding operation is performed. Note that the waveform of the wire feeding speed Vf, that is, shapes of the cycle, the amplitude, and inclination, is determined beforehand for each of set currents set for the arc welding apparatus 17.

During the arc period Ta, the welding wire 19 is fed forward, and the welding current Aw increases to a predetermined peak current value based on a control signal from the arc controller 12. In this manner, a melting rate at the tip of the welding wire 19 is raised to form droplets. In the subsequent short-circuit period Ts, the droplets are transferred to a molten pool (not shown). In this manner, arc welding for the workpiece 18 is performed by repeating the arc periods Ta and the short-circuit periods Ts. In each of the short-circuit periods Ts, the welding current Aw is controlled in such a manner as to increase with an elapse of time to open the short-circuit state. This operation will be hereinafter described in more detail.

As shown in FIG. 2, the arc period Ta starts from a time t1, and the welding wire 19 is fed forward to the workpiece 18 with acceleration. In addition, as described above, the welding current Aw starts to increase. The welding voltage Vw rises rapidly, and gradually decreases after reaching a predetermined voltage value. Moreover, immediately after the time t1, the arc 20 starts to be generated between the workpiece 18 and the welding wire 19 as shown in a state (a). At a time t2, the welding wire 19 starts deceleration after the wire feeding speed Vf changing in a sine wave shape reaches a maximum value. As a result, the welding current Aw also decreases. At this time, as shown in a state (b), droplets are formed at the tip of the welding wire 19, and the arc 20 grows and forms a molten pool (not shown) in the workpiece 18.

At a time t3, that is, at a time when the wire feeding speed Vf changing in a sine wave shape has changed by a half cycle, in other words, at a time when the decelerated wire feeding speed Vf becomes a speed close to zero or a speed equal to or lower than a basic feeding speed Vf0 after forward feeding of the welding wire 19 with an elapse of the half cycle, the wire feeding speed Vf becomes zero. As a result, feeding of the welding wire 19 stops. In addition, the feeding stop state of the welding wire 19 is maintained for a predetermined period from the time t3 to a time t4. This feeding stop will be hereinafter referred to as a first feeding stop step in some cases. Moreover, the predetermined period of the feeding stop of the welding wire 19 during forward feeding will be referred to as a first feeding stop period Tz1 in some cases. Furthermore, at the time t3, the tip of the welding wire 19 is positioned above the workpiece 18 with a predetermined clearance left therebetween (see state (c)). After the time t3, the welding current Aw further decreases.

From the time t4, the welding wire 19 starts to be fed forward at a constant feeding speed (hereinafter referred to as a first feeding speed Vf1 in some cases). In the following description, the restarted forward feeding operation will be referred to as a first wire forward feeding step in some cases. By this forward feeding operation, the tip of the welding wire 19 collides with the workpiece 18, and the welding wire 19 and the workpiece 18 are short-circuited as shown in a state (d). Note that the first feeding speed Vf1 is set to a value lower than the basic feeding speed Vf0 determined in accordance with a welding current to be set (hereinafter referred to as a set current in some cases). Note that the basic feeding speed Vf0 is a speed corresponding to a moving average of the wire feeding speed Vf changing in a sine wave shape.

At a time t5, the short-circuit and arc detector 9 detects this short circuit as described above. A detection signal is sent to the wire feeding speed controller 14, and the feeding operation of the welding wire 19 is switched from forward feeding to backward feeding to start the short-circuit period Ts. Moreover, from the time t5, the welding wire 19 is fed backward in the direction away from the workpiece 18 with acceleration. Furthermore, similarly to the arc period Ta, the welding current Aw starts to increase and reaches a predetermined peak current value. The welding voltage Vw rises rapidly, reaches a predetermined voltage value, and then gradually decreases.

When the speed of the backward feeding of the welding wire 19 starts to decrease after the wire feeding speed Vf changing in a sine wave shape reaches a minimum value, the welding current Aw also decreases. At this time, the tip of the welding wire 19 is still in contact with the workpiece 18 as shown in a state (e).

At a time t6, that is, at the time when a wire feeding speed Vf changing in a sine wave shape changes by one cycle, in other words, at a time when the decelerated wire feeding speed Vf becomes a speed close to zero or a speed equal to or higher than a backward feeding stop speed Vf0' after backward feeding of the welding wire 19 with an elapse of the half cycle, the wire feeding speed Vf becomes zero. As a result, feeding of the welding wire 19 stops. In addition, the feeding stop state of the welding wire 19 is maintained for a predetermined period from the time t6 to a time t7. Note that the backward feeding stop speed Vf0' is a threshold for stopping wire feeding on the backward feeding side, and is a value corresponding to a negative value (−Vf0) of the basic feeding speed Vf0. While the basic feeding speed Vf0 is used as a wire feeding stop threshold on the forward feeding side, the backward feeding stop threshold Vf0' is used as the wire feeding stop threshold on the backward feeding side to have a simple configuration. In addition, this feeding stop will be hereinafter referred to as a second feeding stop step in some cases. Moreover, a predetermined period of the feeding stop of the welding wire 19 during backward feeding will be referred to as a second feeding stop period Tz2 in some cases. Furthermore, in the second feeding stop period Tz2, a constriction is produced near the tip of the welding wire 19. The tip of the welding wire 19 in a narrowed state is in contact with the workpiece 18 (see a state (f)). After the time t6, the welding current Aw further decreases.

From the time t7, the welding wire 19 starts to be fed backward at a constant feeding speed (hereinafter referred to as a second feeding speed Vf2 in some cases). Moreover, in the following description, this restarted backward feeding operation will be referred to as a first wire backward feeding step in some cases. By this backward feeding operation, the welding wire 19 is cut off at a constricted portion of the tip and separated from the workpiece 18 as shown in a state (g). Note that the second feeding speed Vf2 is set to a value lower than the basic feeding speed Vf0 described above.

At a time t8, the short-circuit and arc detector 9 detects opening of a short circuit between the welding wire 19 and the workpiece 18, and determines that the arc state has been established. In addition, a short circuit opening detection signal is sent to the wire feeding speed controller 14, and the feeding operation of the welding wire 19 is switched from backward feeding to forward feeding to again start the short-circuit period Ts.

[Effects etc.]

As described above, the arc welding control method according to the present embodiment is an arc welding control method of a consumable electrode type that alternately performs forward feeding for feeding the welding wire 19 in a direction of the workpiece 18 as a welding object and backward feeding for feeding in an opposite direction to the forward feeding, and feeds the welding wire 19 at the wire feeding speed Vf cyclically changed in a predetermined cycle and at a predetermined amplitude to perform welding by repeating the arc period Ta and the short-circuit period Ts.

Provided during forward feeding of the welding wire 19 are the first wire feeding stop step of stopping feeding of the welding wire 19 at the basic feeding speed Vf0 or less from a time of an elapse of a half cycle of a change of the wire feeding speed Vf to an elapse of the first feeding stop period Tz1, and the first wire forward feeding step of feeding the welding wire 19 forward at the first feeding speed Vf1 from an elapse of the first feeding stop period Tz1 to an elapse of a predetermined period. The welding wire 19 is fed backward after the elapse of the predetermined period. Note that the predetermined period corresponds to a period from a time (time t4) of an elapse of the first feeding stop period Tz1 to the time t5 at which the short-circuit and arc detector 9 detects a short circuit between the workpiece 18 and the welding wire 19 during forward feeding of the welding wire 19.

According to the present embodiment, feeding of the welding wire 19 is stopped before collision between the welding wire 19 and the workpiece 18. After the stop of feeding, the welding wire 19 is again fed at the first feeding speed Vf1 lower than the basic feeding speed Vf0 to collide with the workpiece 18 and cause a short circuit. As a result, spatters generated during short-circuiting can be reduced by reducing impact produced when the welding wire 19 collides with the workpiece 18. In addition, elongation of the short-circuit period Ts can be reduced by reliably short-circuiting the welding wire 19 and the workpiece 18 via droplets formed at a tip of the welding wire 19. Accordingly, improvement of arc stability is achievable by stabilizing the short-circuit cycle.

In addition, the arc welding control method of the present embodiment includes, during backward feeding of the welding wire 19, the second wire feeding stop step of stopping feeding of the welding wire 19 from a time of an elapse of a half cycle of a change of the wire feeding speed Vf to an elapse of the second feeding stop period Tz2, and the first wire backward feeding step of feeding the welding wire 19 backward at the second feeding speed Vf2 from an elapse of the second feeding stop period Tz2 to an elapse of a predetermined period. The welding wire 19 is fed forward after the elapse of the predetermined period. Note that the predetermined period corresponds to a period from a time (time t7) of an elapse of the second feeding stop period Tz2 to the time t8 at which the short-circuit and arc detector 9 detects opening of a short circuit between the workpiece 18 and the welding wire 19 during backward feeding of the welding wire 19.

According to the present embodiment, feeding of the welding wire 19 is stopped before cut off and separation of the welding wire 19 from the workpiece 18. After the stop of feeding, the welding wire 19 is again fed at the second feeding speed Vf2 having an absolute value smaller than an absolute value of the basic feeding speed Vf0 to separate from the workpiece 18. In this manner, droplets at the tip of the welding wire 19 drop toward the workpiece 18 by an own weight of the welding wire 19 in an appropriately constricted state of the welding wire 19. Accordingly, the welding wire 19 can be reliably cut off and separated from the workpiece 18. Moreover, variations in timing of cut off and separation of the welding wire 19 from the workpiece 18 in accordance with the material, the wire diameter, and the like of the welding wire 19 can be reduced by avoiding excessive constriction of the welding wire 19. In this manner, improvement of arc stability is achievable by reducing variations in the short-circuit period Ts and thereby stabilizing the short-circuit cycle. Furthermore, spatters during opening of short-circuiting can be reduced.

In addition, in one preferred embodiment, the welding wire 19 is made of aluminum, aluminum alloy, copper, or copper alloy, each having low viscosity when melted. These points will be further described below.

Figure 3:
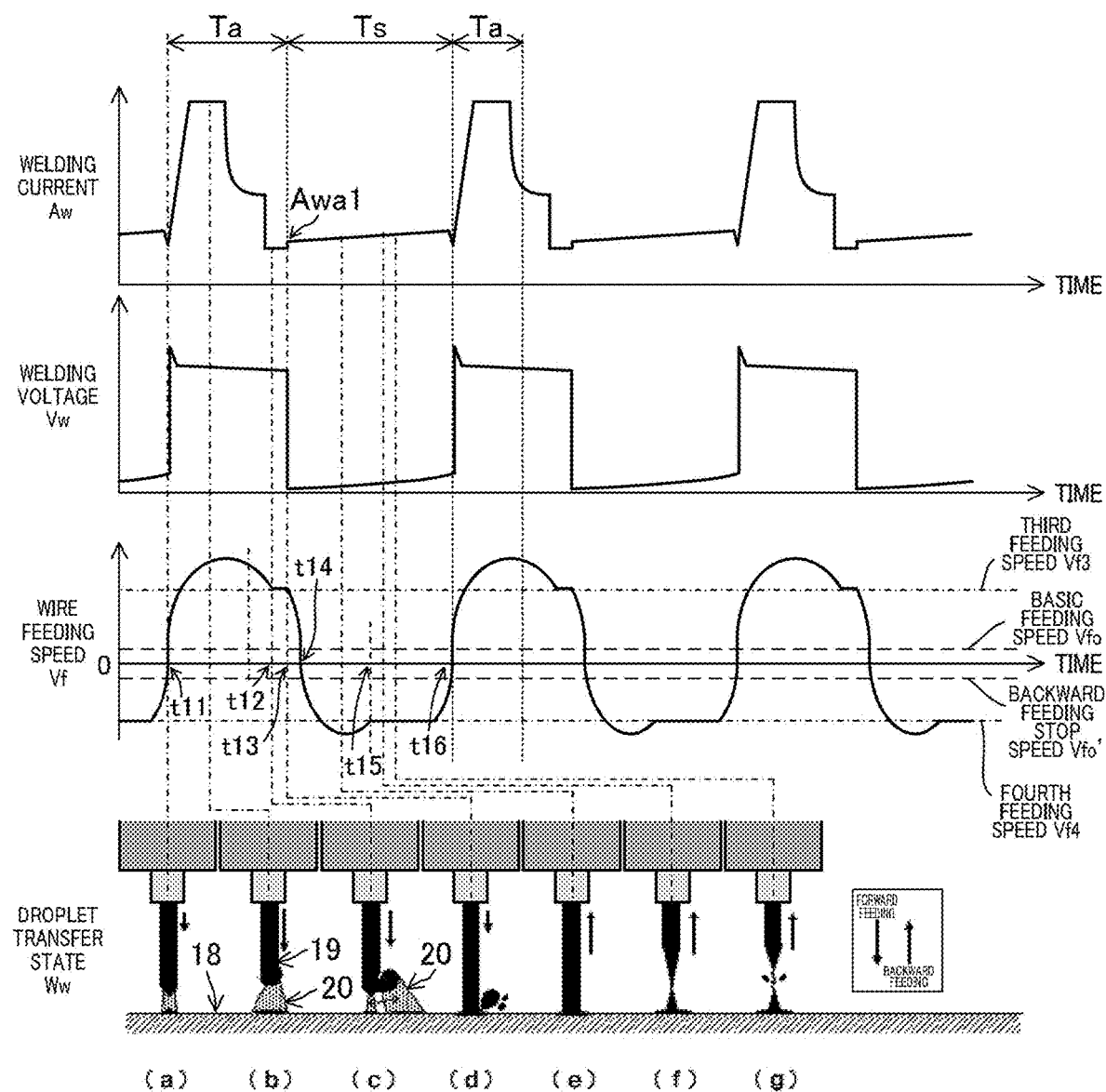
FIG. 3 is a time chart showing various output waveforms for comparison.

FIG. 3 shows a time chart of various output waveforms for comparison, showing changes of the wire feeding speed Vf, the welding current Aw, and the welding voltage Vw with time similarly to FIG. 2. FIG. 3 further shows a change of a droplet transfer state Ww with time at a tip of the welding wire 19.

The time chart shown in FIG. 2 and the time chart shown in FIG. 3 are different from each other in the waveform of the wire feeding speed Vf which cyclically changes. The wire feeding speed Vf shown in FIG. 3 becomes the basic feeding speed Vf0 at a time t11. The wire feeding speed Vf increases from the time t11, and reaches a maximum value (corresponding to ¼ cycle). Thereafter, the wire feeding speed Vf is decelerated, and maintained at a predetermined speed, i.e., a third feeding speed Vf3 in this case, at a time t12. As shown in FIG. 3, the third feeding speed Vf3 is a value higher than the basic feeding speed Vf0.

From a time (time t13) when a short circuit between the welding wire 19 and the workpiece 18 is detected by the short-circuit and arc detector 9, the wire feeding speed Vf starts to decrease, and the feeding operation is switched to the backward feeding operation at a time t14. After the wire feeding speed Vf reaches a minimum value, the backward feeding speed of the welding wire 19 starts to decrease, and is maintained at a predetermined speed, i.e., a fourth feeding speed Vf4 in this case, at a time t15. As shown in FIG. 3, the fourth feeding speed Vf4 is a value higher than the basic feeding speed Vf0. From a time (time t16) when opening of a short circuit between the welding wire 19 and the workpiece 18 is detected by the short-circuit and arc detector 9, an absolute value of the wire feeding speed Vf starts to decrease, and the feeding operation is switched to the forward feeding operation after an elapse of a predetermined period.

As shown in FIG. 3, droplets formed at the tip of the welding wire 19 may cause a transfer delay due to inertia when the welding wire 19 collides with the workpiece 18 in a state of feeding at a speed (third feeding speed Vf3) having a larger absolute value than an absolute value of the basic feeding speed Vf0, even after slight deceleration of the feeding. In particular, this tendency increases when the welding wire 19 is made of a material having low viscosity when melted, such as any one of aluminum, aluminum alloy, copper, and copper alloy. In this case, the welding wire 19 is short-circuited with the workpiece 18 without interposition of droplets. Accordingly, a large amount of spatters are generated during short-circuiting. Moreover, variations in the short-circuit cycle increase.

In addition, when the welding wire 19 is cut off from the workpiece 18 in a feeding state at a speed (fourth feeding speed Vf4) having an absolute value larger than the absolute value of the basic feeding speed Vf0, separation timing of the welding wire 19 also varies. For example, when the welding wire 19 is cut off from the workpiece 18 without sufficient constriction, a large amount of spatters are generated. Moreover, timing at which the welding wire 19 is cut off and separated from the workpiece 18 varies due to a difference in viscosity of the welding wire 19 in a molten state, and the short-circuit cycle varies accordingly. In this case, arc stability lowers.

According to the present embodiment, as described above, reduction of occurrence of these problems, reduction of generation of spatters during a short circuit and/or opening of a short circuit, and improvement of arc stability are achievable.

Moreover, when a distance between welding points varies due to the variations in the short-circuit cycle, beads do not bridge or are burned through in a case of the workpiece 18 constituted by a thin plate (for example, a plate thickness of 1.6 mm or less). The arc welding control method according to the present embodiment can reduce occurrence of these problems. In addition, by reducing variations in the short-circuit cycle, appearance of beads formed by blaze welding is aesthetically enhanced, and appearance design of the beads improves, for example.

Moreover, according to the arc welding control method shown in FIG. 3, a large amount of spatter are generated during a short circuit when the workpiece 18 is a thick plate thicker than the thin plate. According to the arc welding control method shown in the present embodiment, however, welding quality improves by reduction of generation of these spatters.

Further, when a gas containing carbon dioxide gas ($CO_2$ gas) as a main component is used as an assist gas, reduction of generation of spatters during a short circuit, and reduction of variations in the short-circuit cycle are achievable particularly at the time of forward feeding of the welding wire 19. As is well known, in arc welding using a gas containing carbon dioxide gas as a main component, a large arc reaction force is applied to the welding wire 19, and collision between droplets and the workpiece 18 is more difficult to achieve during forward feeding of the welding wire 19 than in a case using other assist gases. Accordingly, there is a high possibility that the welding wire 19 collides with the workpiece 18 without interposition of droplets.

According to the present embodiment, feeding of the welding wire 19 is stopped before collision between the welding wire 19 and the workpiece 18, and the welding wire 19 collides with the workpiece 18 at a low speed (first feeding speed Vf1) after the feeding stop. Accordingly, the droplets of the welding wire 19 and the workpiece 18 can be reliably brought into contact with each other with reduction of an influence of the arc reaction force, thereby reducing occurrence of the above problems. Furthermore, stable high-quality arc welding is achievable while increasing transfer stability of the droplets.

Figure 4:
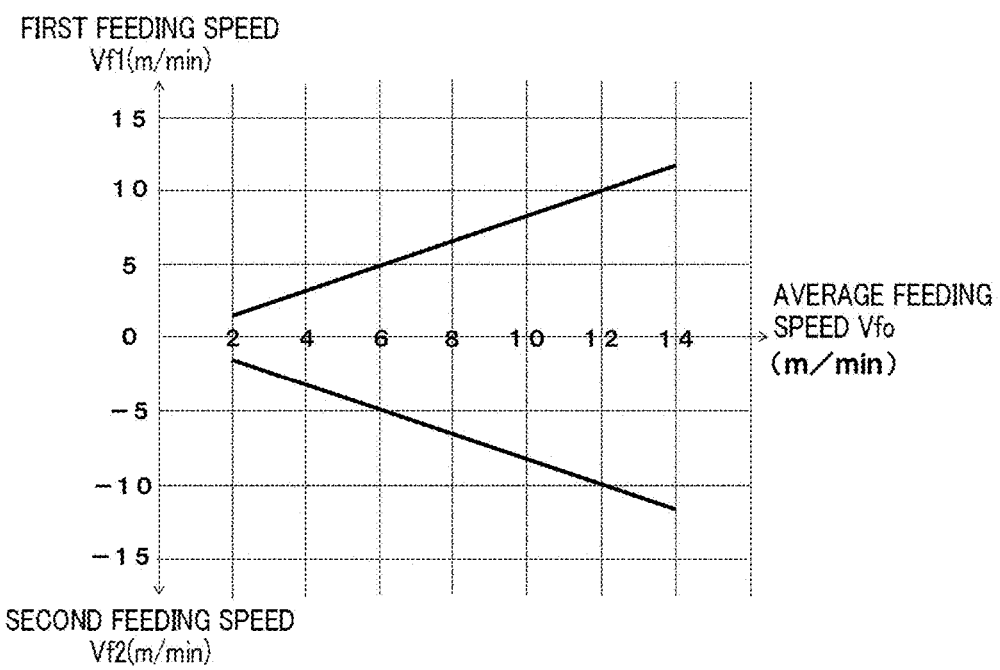
FIG. 4 is a diagram showing a relationship between a basic feeding speed of a welding wire, a first feeding speed, and a second feeding speed.

Moreover, the first and second feeding speeds Vf1 and Vf2 may be fixed values, or the first feeding speed Vf1 may be monotonously increased in accordance with the basic feeding speed Vf0 of the welding wire 19 as shown in FIG. 4. In addition, the second feeding speed Vf2 may be monotonously decreased in accordance with the basic feeding speed Vf0 of the welding wire 19. The basic feeding speed Vf0 increases as the welding current Aw becomes larger. On the other hand, the molten pool formed in the workpiece 18 increases as the welding current Aw becomes larger. Accordingly, no problems occur even if the first and second feeding speeds Vf1 and Vf2 are monotonously changed in accordance with the basic feeding speed Vf0.

Figure 5:
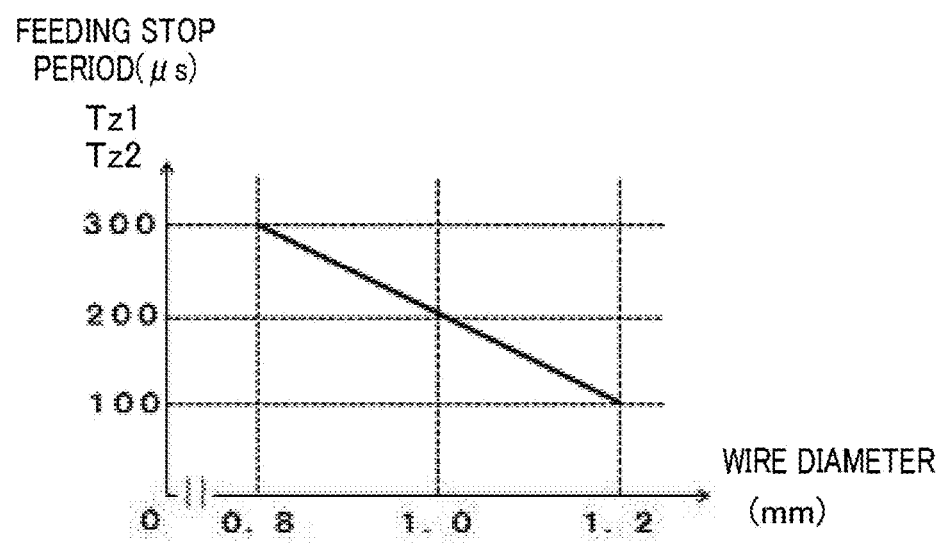
FIG. 5 is a diagram showing a relationship between a wire diameter of a welding wire and first and second feeding stop periods.

Furthermore, in one preferred embodiment, the first feeding stop period Tz1 and the second feeding stop period Tz2 are set so as to monotonously decrease in accordance with the wire diameter of the welding wire 19 as shown in FIG. 5. When the wire feeding speed Vf is equalized, droplets are more difficult to grow as the wire diameter of the welding wire 19 decreases. In this case, the droplets drop onto the workpiece 18 later. Moreover, a wire protruding length, which is a distance between the welding tip 21 and the workpiece 18, also becomes smaller as the wire diameter decreases. On the other hand, when the wire diameter is large, welding grows rapidly. In this case, droplets drop onto the workpiece 18 earlier, and the wire protrusion length also increases. Accordingly, when the wire diameter is small, the first and second feeding stop periods Tz1 and Tz2 are elongated so as to promote dropping with sufficient grow of the droplets during forward feeding of the welding wire 19. In addition, stringing at the tip of the welding wire 19 is shortened during backward feeding of the welding wire 19 to stabilize the short-circuit cycle. Moreover, when the wire diameter is large, the first and second feeding stop periods Tz1 and Tz2 are shortened to reduce variations in the short circuit timing produced by an excessive increase in the size of the droplets during forward feeding of the welding wire 19. Furthermore, the melting amount is reduced during backward feeding of the welding wire 19 to reduce an amount of spatters during opening of a short circuit.

<Modification>

Figure 6:
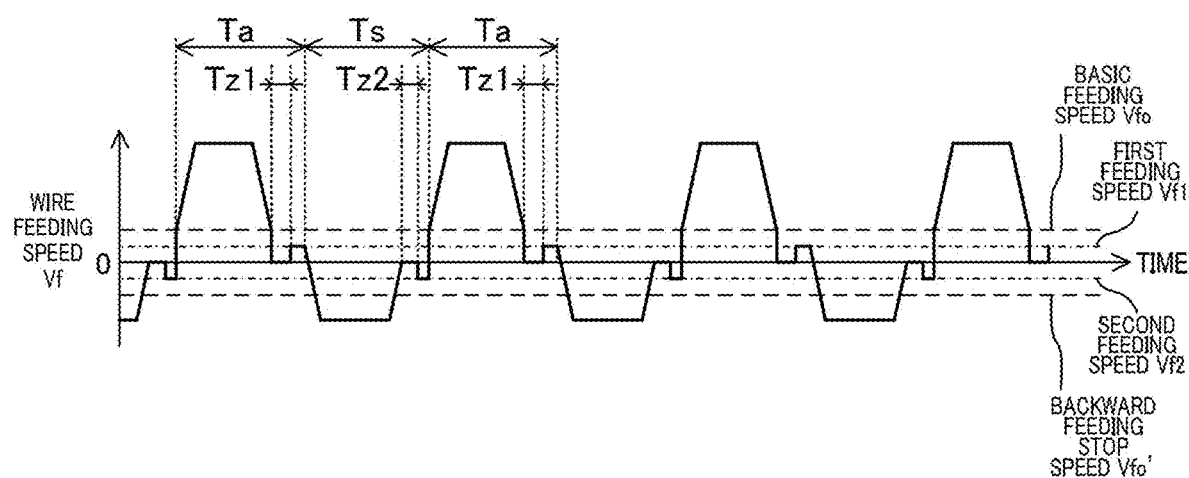
FIG. 6 is a time chart showing an output waveform of a wire feeding speed during arc welding according to a modified example.

FIG. 6 shows an output waveform of a wire feeding speed during arc welding according to a modified example.

In the time chart shown in FIG. 2, the wire feeding speed Vf changes cyclically in a sine wave shape. However, the time chart shown in FIG. 6 is different from the time chart of FIG. 2 in that the wire feeding speed Vf changes cyclically in a trapezoidal wave shape.

As shown in FIG. 2, the wire feeding speed Vf cyclically changes in a sine wave shape. In this case, a rapid change in the wire feeding speed Vf can be reduced without bending points in the output waveform. Accordingly, reduction of variations in an arc length of the arc 20 is achievable.

Meanwhile, as shown in FIG. 6, the wire feeding speed Vf cyclically changes in a trapezoidal wave shape. In this case, an area of the output waveform can be enlarged. That is, responsiveness of the feeding operation of the welding wire 19 improves.

The output waveform of the wire feeding speed Vf may have other shapes as long as the output waveform cyclically changes.

As described above, in a case of forward feeding of the welding wire 19, feeding of the welding wire 19 is stopped from the time of the elapse of the half cycle of the change in the wire feeding speed Vf (time t3) to the time of the elapse of the feeding stop period (time t4), i.e., feeding of the welding wire 19 is stopped in the first feeding stop step described above. However, in a case that the distance between the tip of the welding wire 19 and the base material is 2 mm or less at the time t3, the wire feeding speed Vf is not required to become completely zero, but may be a finite value instead of zero at the time of the feeding stop of the welding wire 19 in the first feeding stop step. For example, the feeding speed may include an extremely low speed of 2 m/min or less.

In these manners, sufficient reduction of the collision force of the welding wire 19 on the molten pool during forward feeding, and therefore reduction of generation of spatters are achievable.

Moreover, in a case of backward feeding of the welding wire 19, feeding of the welding wire 19 is stopped from the time of the elapse of the half cycle of the change in the wire feeding speed Vf (time t6) to the time of the elapse of the feeding stop period (time t7), i.e., feeding of the welding wire 19 is stopped in the second wire feeding stop step described above. However, in a case that the distance of the welding wire 19 is 2 mm or less at the time t6 with respect to a predetermined switching position of wire feeding during backward feeding, as a position at which feeding of the welding wire 19 is switched from backward feeding to forward feeding, the wire feeding speed Vf is not required to become completely zero, but may be a finite value instead of zero at the time of stopping feeding of the welding wire 19 in the second feeding stop step. For example, the feeding speed may include an extremely low speed of 2 m/min or less.

These configurations stabilize short-circuit transfer of droplets at the tip of the welding wire 19 to be brought into contact with the molten pool and transferred, and reduce unnecessary load and impact on the droplets in the process of short-circuit transfer in a state of insufficient transfer from the welding wire 19 to the molten pool at the time of switching of feeding of the droplets of the welding wire 19 from forward feeding to backward feeding. Accordingly, reduction of generation of spatters is achievable. Note that spatters at the time of short-circuit transfer tend to be more generated at the time of collision by contact between droplets of the welding wire 19 and the molten pool during forward feeding than at the time of switching from backward feeding to forward feeding during backward feeding in the feeding operation of the welding wire 19.

The arc welding control method according to the present invention is capable of improving welding quality and reducing an amount of spatters generated as a result of a minute short circuit by stabilizing a short-circuit cycle. This method is useful when applied to arc welding achieved by alternately repeating a forward feeding operation and a backward feeding operation of a welding wire as a consumable electrode.

DESCRIPTION OF REFERENCE CHARACTERS

1 Input Power Source
2 Main Transformer (Transformer)
3 Primary Side Rectifier
4 Switch
5 DCL (Reactor)
6 Secondary Side Rectifier
7 Welding Current Detector
8 Welding Voltage Detector
9 Short-circuit and Arc Detector 10 Output Controller
11 Short-circuit Controller
12 Arc Controller
13 Welding Condition Setting Part
14 Wire Feeding Speed Controller
15 Wire Feeding Speed Detector
16 Calculator
17 Arc Welding Apparatus
18 Workpiece
19 Welding Wire
20 Arc
21 Welding Tip
22 Wire feeder

The invention claimed is:

1. An arc welding control method of a consumable electrode type that alternately performs forward feeding for feeding a welding wire in a direction of a welding object and backward feeding for feeding in an opposite direction to the forward feeding, the arc welding control method comprising:
feeding the welding wire at a wire feeding speed cyclically changed in a predetermined cycle and at a predetermined amplitude to perform welding by repeating an arc period and a short-circuit period;
stopping feeding of the welding wire from a time of an elapse of a first half cycle of a change of the wire feeding speed to an elapse of a first feeding stop period during forward feeding of the welding wire;
feeding the welding wire forward at a first feeding speed from a time of the elapse of the first feeding stop period to an elapse of a first predetermined period; and
feeding the welding wire backward after the elapse of the first predetermined period,
wherein a welding current greater than zero flows through the welding wire during all of the stopping of the feeding of the welding wire from the time of the elapse of the first half cycle of the change of the wire feeding speed to the elapse of the first feeding stop period during forward feeding of the welding wire, the feeding of the welding wire forward at the first feeding speed from the time of the elapse of the first feeding stop period to the elapse of the first predetermined period, and the feeding of the welding wire backward after the elapse of the first predetermined period, and
wherein the first predetermined period is a period from the time of the elapse of the first feeding stop period to detection of a short circuit between the welding object and the welding wire.

2. The arc welding control method of claim 1, wherein the first feeding speed monotonously increases in accordance with a basic feeding speed of the welding wire.

3. The arc welding control method of claim 1, further comprising:
stopping feeding of the welding wire from a time of an elapse of a second half cycle of a change of the wire feeding speed to an elapse of a second feeding stop period during backward feeding of the welding wire;
feeding the welding wire backward at a second feeding speed from a time of an the elapse of the second feeding stop period to an elapse of a second predetermined period; and
feeding the welding wire forward after the elapse of the second predetermined period,
wherein a welding current greater than zero flows through the welding wire during all of the stopping of the feeding of the welding wire from the time of the elapse of the second half cycle of the change of the wire feeding speed to the elapse of the second feeding stop period during the backward feeding of the welding wire, the feeding of the welding wire backward at the second feeding speed from the time of the elapse of the second feeding stop period to the elapse of the second predetermined period, and the feeding of the welding wire forward after the elapse of the second predetermined period, and
wherein the second predetermined period is a period from the time of the elapse of the second feeding stop period to detection of opening of a short circuit between the welding object and the welding wire.

4. The arc welding control method of claim 3, wherein the second feeding speed monotonously decreases in accordance with a basic feeding speed of the welding wire.

5. The arc welding control method of claim 3, wherein the second feeding speed is a negative value, and
the feeding of the welding wire forward after the elapse of the second predetermined period is performed immediately after the elapse of the second predetermined period.

6. The arc welding control method of claim 3, wherein the second feeding stop period monotonously decreases in accordance with a wire diameter of the welding wire.

7. The arc welding control method of claim 1, wherein the first feeding stop period monotonously decreases in accordance with a wire diameter of the welding wire.

8. The arc welding control method of claim 1, wherein the wire feeding speed cyclically changes in a sine wave shape.

9. The arc welding control method of claim 1, wherein the wire feeding speed cyclically changes in a trapezoidal wave shape.

10. The arc welding control method of claim 1, wherein an assist gas used for arc welding is an inert gas.

11. The arc welding control method of claim 1, wherein an assist gas used for arc welding is a gas that contains carbon dioxide gas as a main component.

12. The arc welding control method of claim 1, wherein the welding wire is made of aluminum, aluminum alloy, copper, or copper alloy.

13. The arc welding control method of claim 1, wherein the first feeding speed is a positive value, and
the feeding of the welding wire backward after the elapse of the first predetermined period is performed immediately after the elapse of the first predetermined period.

* * * * *